L. ECKEL.
DOUGH MOLDING APPARATUS.
APPLICATION FILED APR. 25, 1914.

1,163,814.

Patented Dec. 14, 1915.
2 SHEETS—SHEET 2.

Witnesses:

Louis Eckel,
Inventor

UNITED STATES PATENT OFFICE.

LOUIS ECKEL, OF MOUNT VERNON, NEW YORK.

DOUGH-MOLDING APPARATUS.

1,163,814.    Specification of Letters Patent.    Patented Dec. 14, 1915.

Application filed April 25, 1914. Serial No. 834,414.

*To all whom it may concern:*

Be it known that I, LOUIS ECKEL, a citizen of the United States, residing at Mount Vernon, county of Westchester, State of New York, have invented certain new and useful Improvements in Dough-Molding Apparatus, of which the following is a specification.

The object of the invention is to provide an apparatus for automatically molding pieces of dough into loaves or into any desired shape, and to effect the expulsion of gases contained in the dough simultaneously with the molding thereof. And to this end the invention resides in providing a rotor for advancing and rolling the dough upon a stator in the form of an inclined platform and thence onto a second inclined platform on which the dough is rolled by the action of gravity and which directs the dough onto an apparatus for forming it into loaves or pieces of any desired shape.

Other objects will appear and be better understood from that embodiment of my invention of which the following is a specification, reference being had to the accompanying drawing forming part hereof, in which:—

Figure 1:
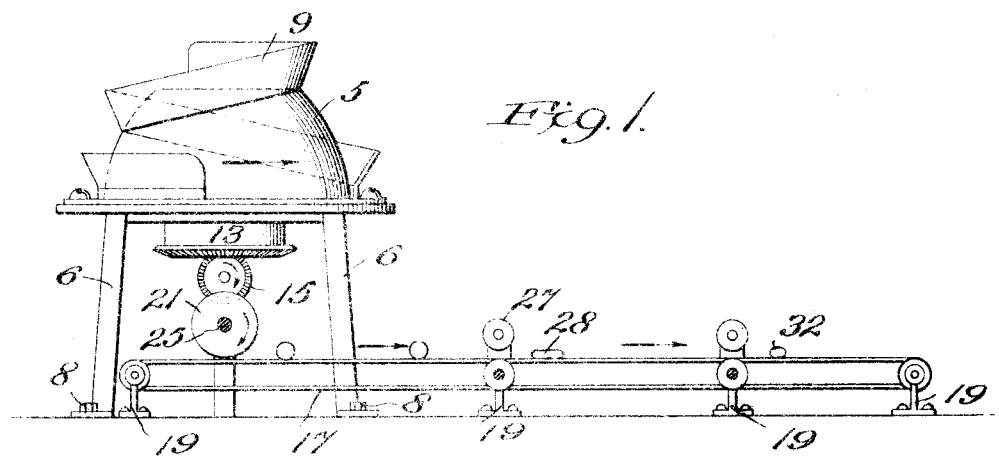
Figure 2:
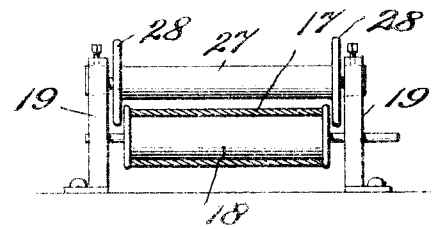
Figure 3:
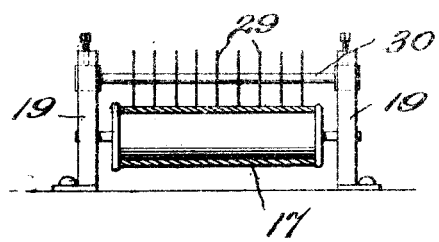
Figure 4:
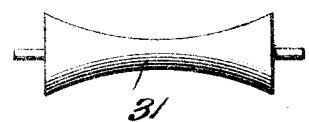
Figure 5:
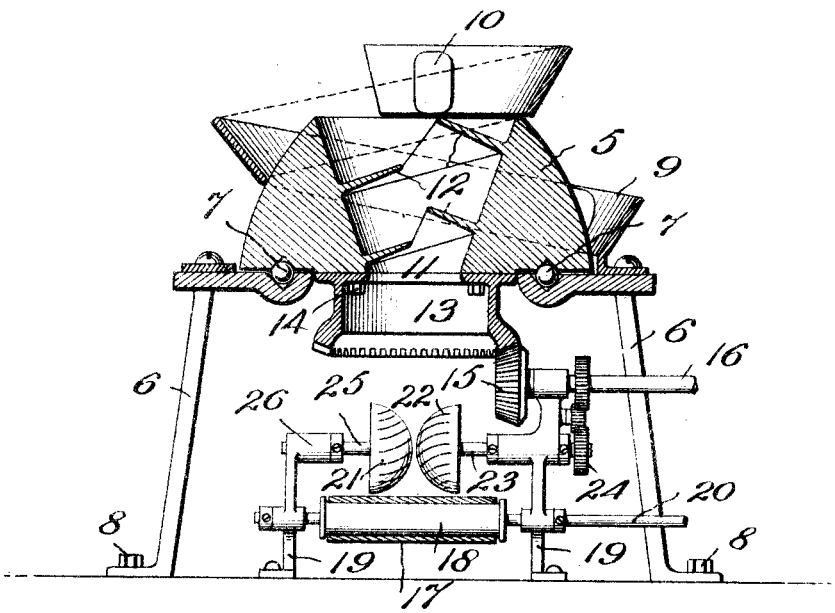
Figure 6:
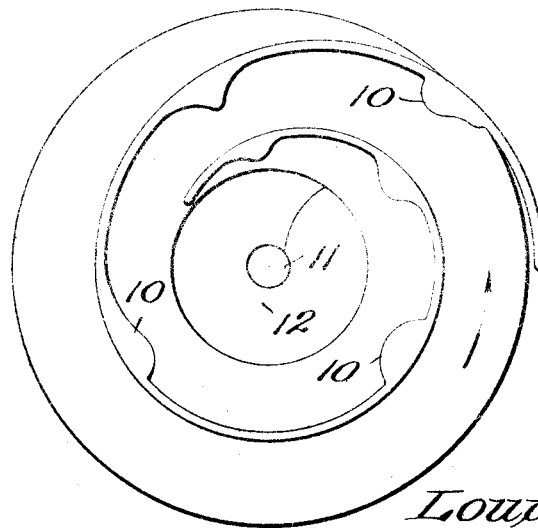

Figure 1 is a side elevation partly in section of the invention. Fig. 2 is a detail cross section showing an element for forming a flattened oblong loaf. Fig. 3 is a detail cross section showing an attachment for sub-dividing a piece of dough into pieces of required dimensions. Fig. 4 is a detail front elevation of an element for forming a Vienna loaf. Fig. 5 is an enlarged detail vertical section taken at right angles to Fig. 1 and showing the apparatus for rolling the dough into balls and for conveying the same. Fig. 6 is a detail plan of the rotor and the stator.

The rotor 5 is superimposed upon an upright support 6 and bearing balls 7 are interposed between the roller and the support 6 to facilitate the turning of the rotor on the support. The rotor is formed of wood or other suitable material and the upright support 6 is suitably fastened to the floor, such as by bolts 8.

The stator 9 surrounds the rotor 5 and is so constructed that it will function as a platform for a piece of dough interposed between it and the rotor, and coöperate with the rotor in the advancing of the dough thereby from one end of the stator to the other. In the present instance the stator is shown in the form of an involute spiral attached at one end to the upright support 6 and encircling the rotor 5. The spiral is preferably formed of metal and rectangular in cross section and has its inner surface arranged oblique to the outer surface of the rotor 5. In consequence of the inclination of the stator to the rotor a trough, somewhat V-shape in cross section, is provided for the dough. And since the lower edge of the stator is in juxtaposition to the outer surface of the rotor the dough is thereby prevented from falling through the trough.

It will be observed that the outer surface of the rotor is convex so that when the dough in the trough is operated upon by the turning of the rotor and advanced along the stator a round or spherical shape will be imparted to the dough, due to the rolling action it received on the surfaces of the rotor and stator. To facilitate the rounding of a piece of dough advancing through the aforesaid trough the stator is provided at chosen intervals and on its inner surface with protuberances 10 of any desired configuration and arranged so as to intercept the dough as this is moved through the trough. By the presence of the protuberances it is calculated that these will so operate on irregularities in the surface of the dough moving thereagainst as to render these symmetrical with the rounded portion of the surface of the piece of dough by the time that this has been advanced to the upper end of the stator. It will be observed that the upper end of the stator is disposed above the upper end of the rotor, in fact, its end edge extends substantially coincident with the wall of an axial opening 11 formed in the rotor so that the dough upon approaching the end of the stator, will be deflected thereby into the opening 11 and onto an inclined spiral platform 12 which extends reversely to the spiral of the stator and is arranged in the opening 11. The upper surface of the latform is disposed obliquely to the wall of the opening 11 so that an angular shaped trough is provided for the reception of the dough dropping into the opening 11. The dough upon falling onto the platform 12 is operated by gravity to descend on the said platform, the lower end of which is arranged to discharge the dough onto the mechanism for forming it into loaves or other desired shapes and which will subsequently be described The rotor is driven by a suitable motor (not shown) to which it is suitably connected. In the present instance, the connection is shown to be effected by means of an open ended cylinder 13 which surrounds the opening 11 and which is bolted as at 14, or otherwise suitably connected to the lower end of the rotor. The lower end of this cylinder 13 is adapted to form one component of a bevel gear, the other component 15 of which is attached to a drive shaft 16. Located below the opening 11 and in alinement therewith is one end of an endless conveyer 17 mounted on the conventional form of rolls 18 which are carried by bearings forming part of uprights 19—19. One of these rolls, to wit, one of the end rolls, has a drive shaft 20 which is suitably connected to a motor (not shown) which operates to drive the conveyer 17. Interposed between the upper face of the conveyer and the lower end of the opening 11 is a bolster onto which the dough is precipitated from the opening 11. This bolster is constructed so as to deliver the dough to the conveyer 17 and to restore the symmetry which the dough may have lost in dropping from the platform 12 onto the bolster. In the present instance this bolster is shown to be formed of a pair of hemispherical members 21 and 22 the convex surfaces of which are opposed and arranged in juxtaposition. The bolster 22 is mounted upon a shaft 23 which is geared as indicated by 24 to the shaft 16. The bolster 21 is mounted on a shaft 25 which is journaled in a bearing 26. With this construction it is obvious that a piece of dough dropping onto the elements 21 and 22, will, when the member 22 rotates for instance in the direction of the arrow shown in Fig. 1, be advanced onto the conveyer 17 and at the same time turned on the surfaces of the elements 21 and 22 and thereby rounded.

Arranged over the upper surface of the conveyer 17 is a cylindrical roller 27 which is journaled in the uprights 19. This roller has flanged ends 28 and its surface is arranged in such relation to the upper surface of the conveyer 17 as to effect a predetermined reduction in cross sectional area of a relatively large piece of dough conveyed thereunder and beyond, by the conveyer 17, for instance, the piece of dough indicated by the arrow on the left in Fig. 1 will have received a compression of reduction as indicated by 28 in the same figure, while being conveyed from the position indicated by the arrow to that indicated by 28. The uprights 19 to the right of the roller 27 in Fig. 1 of the drawings are adapted for permitting the journaling therein, a cutter made up of a series of blades 29 mounted on a shaft 30 as shown in Fig. 3, or a concaved roller 31 as shown in Fig. 4. These uprights are also further adapted to permit of the cutter or roller 31 being readily attached to and detached therefrom. The cutters are used when it is desired to slice the dough and the roller 31 is employed for molding a piece of dough into a substantially oval shape as indicated by 32 in Fig. 1.

What is claimed as new is:

1. A dough molding apparatus comprising a hollow open ended rotor, a spiral stator surrounding the rotor, the said rotor and stator being arranged in such relation to each other as to admit of their adjacent surfaces providing an upwardly inclined trough on the outer face of the rotor adapted for containing the dough to be molded, the said rotor and stator being further arranged so as to permit the rotor in turning to advance the dough through the trough and to the upper end of the stator, and still further arranged so as to have the upper end of the trough positioned to direct the dough into the upper end of the rotor, means for operating the rotor, and a rotating bolster arranged substantially in axial alinement with the opening of the rotor for the purpose set forth.

2. A dough molding apparatus comprising a hollow open ended rotor, a spiral stator surrounding the rotor, the said rotor and stator being arranged in such relation to each other as to admit of their adjacent surfaces providing an upwardly inclined trough on the outer face of the rotor adapted for containing the dough to be molded, the said rotor and stator being further arranged so as to permit the rotor in turning to advance the dough through the trough and to the upper end of the stator, and still further arranged so as to have the upper end of the trough positioned to direct the dough into the upper end of the rotor, means for operating the rotor, a rotating bolster arranged in alinement with the opening of the rotor, and a conveyer disposed beneath the bolster for the purpose set forth.

3. A dough molding apparatus comprising a hollow open-ended rotor, a spiral stator surrounding the rotor, the said rotor and stator being arranged in such relation to each other as to admit of their adjacent surfaces providing an upwardly inclined trough on the outer face of the rotor adapted for containing the dough to be molded, the said rotor and stator being further arranged so as to permit the rotor in turning to advance the dough through the trough and to the upper end of the stator, and still further arranged so as to have the upper end of the trough positioned to direct the dough into the upper end of the rotor, means for operating the rotor, a bolster arranged in alinement with the opening of the rotor, and a spiral platform arranged on the inner surface of the rotor and adapted for receiving the dough directed into the upper end of the stator and for directing the said dough onto the bolster.

4. A dough molding apparatus comprising a hollow open-ended rotor, a spiral stator surrounding the rotor, the said rotor and stator being arranged in such relation to each other as to admit of their adjacent surfaces providing an upwardly inclined trough on the outer face of the rotor adapted for containing the dough to be molded, the said rotor and stator being further arranged so as to permit the rotor in turning to advance the dough through the trough and to the upper end of the stator, and still further arranged so as to have the upper end of the trough positioned to direct the dough into the upper end of the rotor, means for operating the rotor, a bolster arranged in alinement with the opening of the rotor, a spiral platform arranged on the inner surface of the rotor and adapted for receiving the dough directed into the upper end of the stator and for directing the said dough into the bolster, and a conveyer disposed beneath the bolster for the purpose set forth.

5. A dough molding apparatus comprising a hollow open-ended rotor, a spiral stator surrounding the rotor, the said rotor and stator being arranged in such relation to each other so as to admit of their adjacent surfaces providing an upwardly inclined trough on the outer face of the rotor adapted for containing the dough to be molded, the said rotor and stator being further arranged so as to permit the rotor in turning to advance the dough through the trough and to the upper end of the stator, and still further arranged so as to have the upper end of the trough positioned to direct the dough into the upper end of the rotor, means for operating the rotor, a bolster arranged in alinement with the opening of the rotor, a spiral platform arranged on the inner surface of the rotor and adapted for receiving the dough directed into the upper end of the stator and for directing the said dough into the bolster, a conveyer disposed beneath the bolster, and a series of rollers disposed transversely of the conveyer and arranged in operative relation thereto for the purpose set forth.

6. In an apparatus for molding dough, the combination of an open ended rotor, a spiral shape stator surrounding the rotor and having its upper end edge disposed above the rotor and substantially in alinement therewith, and a spiral platform located within the rotor and arranged to receive the dough, said platform disposed so as to extend reversely to the spiral of the stator so as to direct the dough through the bottom of the rotor.

7. In an apparatus for molding dough, the combination of an open-ended rotor and a spiral shape stator surrounding the rotor, the adjacent surfaces of said rotor and stator being arranged in such relation as to provide a spiral dough trough, the upper end of which is arranged to discharge into the opening of the rotor, and a spiral inclined platform located in the opening of the rotor and arranged to receive the dough, said platform disposed so as to extend reversely to the spiral of the stator so as to direct the dough through the bottom of the rotor.

8. A dough molding apparatus comprising a hollow open-ended rotor, a spiral stator surrounding the rotor, the said rotor and stator being arranged in such relation to each other as to admit of their adjacent surfaces providing an upwardly inclined trough on the outer face of the rotor adapted for containing the dough to be molded, the said rotor and stator being further arranged so as to permit the rotor in turning to advance the dough through the trough and to the upper end of the stator, and still further arranged so as to have the upper end of the trough positioned to direct the dough into the upper end of the rotor, a bolster comprising a pair of rotatable members arranged in alinement with the opening of the rotor and means for operating the bolster and the rotor.

9. In an apparatus for molding dough, the combination of an open ended rotor and a spiral shaped stator surrounding the rotor, the adjacent surfaces of said rotor and stator being arranged in such relation as to provide a spiral dough trough, the upper end of which is arranged to discharge into the opening of the rotor, a spiral platform located in the opening of the rotor and arranged to receive the dough, said platform disposed so as to extend reversely to the spiral of the stator so as to direct the dough through the bottom of the rotor and a bolster comprising a pair of rotatable members arranged in alinement with the opening of the rotor for the purpose set forth.

In testimony whereof I, Louis Eckel have signed my name to this specification in the presence of two subscribing witnesses, this 21st day of April, 1914.

LOUIS ECKEL.

Witnesses:
C. James Cronin,
M. E. Laughlin.